(12) United States Patent
Page et al.

(10) Patent No.: US 8,193,273 B2
(45) Date of Patent: Jun. 5, 2012

(54) THERMOPLASTIC ELASTOMERS FOR ADHESION TO POLYAMIDE

(75) Inventors: Charles Page, Karlsruhe (DE); Dirk von Falkenhayn, Baden-Baden (DE)

(73) Assignee: Polyone Corporation, Avon Lake, OH (US)

( * ) Notice: Subject to any disclaimer, the term of this patent is extended or adjusted under 35 U.S.C. 154(b) by 222 days.

(21) Appl. No.: 12/301,998

(22) PCT Filed: May 17, 2007

(86) PCT No.: PCT/US2007/069097
§ 371 (c)(1),
(2), (4) Date: Nov. 21, 2008

(87) PCT Pub. No.: WO2007/140127
PCT Pub. Date: Dec. 6, 2007

(65) Prior Publication Data
US 2010/0227967 A1 Sep. 9, 2010

Related U.S. Application Data

(60) Provisional application No. 60/803,449, filed on May 30, 2006.

(51) Int. Cl.
*C08K 5/34* (2006.01)
*C08K 5/521* (2006.01)
*C08L 25/08* (2006.01)
*C08L 25/10* (2006.01)

(52) U.S. Cl. .......... 524/515; 524/514; 524/261; 524/99; 525/63; 525/191

(58) Field of Classification Search .................. 524/261, 524/514, 515, 99; 525/63, 191
See application file for complete search history.

(56) References Cited

U.S. PATENT DOCUMENTS

| | | | |
|---|---|---|---|
| 4,174,358 A | 11/1979 | Epstein | |
| 4,305,865 A | 12/1981 | Okada et al. | |
| 4,429,076 A | 1/1984 | Saito et al. | |
| 4,593,066 A | 6/1986 | Dean | |
| 5,750,268 A | 5/1998 | Mace et al. | |
| 5,843,577 A * | 12/1998 | Ouhadi et al. | 428/474.7 |
| 5,919,865 A | 7/1999 | Perret et al. | |
| 6,300,418 B1 | 10/2001 | Brzoskowski et al. | |
| 7,435,776 B2 | 10/2008 | Gu et al. | |
| 2002/0099136 A1 | 7/2002 | Park et al. | |
| 2002/0147272 A1 | 10/2002 | Park et al. | |
| 2005/0131154 A1* | 6/2005 | Cai et al. | 525/192 |
| 2005/0148727 A1* | 7/2005 | Ajbani et al. | 525/63 |
| 2009/0069487 A1 | 3/2009 | Gu et al. | |

FOREIGN PATENT DOCUMENTS

EP 1582563 * 5/2005

* cited by examiner

*Primary Examiner* — James J Seidleck
*Assistant Examiner* — Deve E Valdez
(74) *Attorney, Agent, or Firm* — John H. Hornickel

(57) ABSTRACT

A thermoplastic elastomer (TPE) is disclosed which has excellent compression set and adhesion to both polyamide 6 and polyamide 6,6 for use in two-part component polymer structures.

13 Claims, No Drawings

THERMOPLASTIC ELASTOMERS FOR ADHESION TO POLYAMIDE

CLAIM OF PRIORITY

This application claims priority from U.S. Provisional Patent Application Ser. No. 60/803,449 and filed on May 30, 2006, which is incorporated by reference.

FIELD OF THE INVENTION

This invention relates to thermoplastic elastomers, polymer compounds which exhibit elasticity while remaining thermoplastic.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers combine the benefits of elastomeric properties of thermoset polymers, such as vulcanized rubber, with the processing properties of thermoplastic polymers.

Different types of polymers can serve different purposes when combined into a single construction. For example, "two-part component" extrusion or molding has recently become popular to provide one type of rheology in one part of the component and a second type of rheology in a second part of the component. A specific use of two-part component thermoplastic compounds is insulating strips for vehicle doors. One part has a relatively rigid theological structure for securing the component to the door, with the second part being a relative flexible rheological structure to compress and seal the door to the vehicle.

Polyamide, also called nylon, is an excellent polymer for the relatively rigid rheological structure. But nylon is notorious for being difficult to adhere to other types of polymers, particularly thermoplastic elastomers that are useful for the relatively flexible theological structure of an insulation strip for an automobile door seal.

SUMMARY OF THE INVENTION

What the art needs is a new formulation of thermoplastic elastomer (also called "TPE") that can adhere to polyamide-containing compounds, in order to form excellent two-part component extruded or molded parts.

The present invention solves the problem by formulating a TPE that provides excellent adhesion to polyamide (also called "PA").

One aspect of the invention is a thermoplastic elastomer compound, comprising (a) high molecular weight maleated styrene-ethylene-butylene-styrene; (b) plasticizer; (e) processing aid; and (d) polyamide, also optionally but preferably further comprising styrene-containing thermoplastic elastomer.

Another aspect of the invention is a two-component article, comprising the above compound as one component and polyamide as the second component Features of the invention will become apparent with reference to the following embodiments.

EMBODIMENTS OF THE INVENTION

TPE and Compatibilizer

One type of TPE is based on styrene (also called "TPE-S"). In traditional TPE formulations, use of a low molecular weight maleated styrene-ethylene-butylene-styrene ("MAH-g-SEBS") as a compatibilizer resulted in a poor compression set at elevated temperatures (typically >80% at 70° C., and >90% at 100° C.). A commercial example of low molecular weight maleated SEBS ("LMW MAH-g-SEBS") is Kraton FG1901x, having a weight average molecular weight of about 76,900.

However, the recent commercialization of a high molecular weight maleated SEBS (Kraton MD6684CS) has made it possible to overcome these problems and create TPE compounds with improved compression set values at the same elevated temperatures (typically <40% at 70° C. and <65% at 100° C.). A commercial example of a high molecular weight maleated SEBS ("HMW MAH-g-SEBS"), Kraton MD6684CS, has a weight average molecular weight of about 250,000. Therefore, for purposes of this invention, "high molecular weight" for maleated SEBS means a weight average molecular weight of at least about 200,000. Desirably, the "high molecular weight" is at least about 225,000, and preferably at least about 250,000.

Typically, commercial grades of TPE-S are a complex combination of TPE, compatibilizer, plasticizer, processing aid, filler, antioxidant, antiblocking agent, and one or more secondary polymers.

The present invention replaces the LMW MAH-g-SEBS with a HMW MAH-g-SEBS serving as a compatibilizer and introduces a secondary polymer, preferably PA which assists in compatibilization.

Non-limiting examples of TPE-S include styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof. These examples of TPE-S are not maleated but have weight average molecular weights in excess of 100,000 and preferably in excess of 200,000. Commercially available grades of these TPE-S compounds are Kraton G1651 and Kraton MD 6933 from Kraton Polymers and Septon 4077 and Septon 4099 from Kuraray.

An example of HMW MAH-g-SEBS is Kraton MD6684CS.

The replacement of LMW MAH-g-SEBS with HMW MAH-g-SEBS is also applicable to other types of TPEs, among them thermoplastic vulcanizates (TPVs), thermoplastic polyurethanes (TPUs), and thermoplastic olefins (TPOs), except that the TPE portion of the high molecular weight compatibilizer will need to be adjusted, as needed, to be compatible with the type of TPE employed.

Other Ingredients

Any conventional plasticizer, preferably a paraffinic oil, is suitable for use the present invention.

A preferred processing aid is a hydrocarbon resin, preferably a rosin ester, because it improves processability of the compound within the mixing vessel, a particular problem with high molecular weight TPEs.

A preferred secondary polymer for the present invention is polyamide, as mentioned above, because the polyamide promotes adhesion to polyamide-containing other component of the two-part component molded or extruded article.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Table 1 shows the acceptable, desirable, and preferable ranges of ingredients for the TPE of the present invention.

TABLE 1

Ranges of Ingredients

| Ingredient (Wt. Percent) | Acceptable | Desirable | Preferable |
|---|---|---|---|
| TPE* | 0-80% | 2-35% | 8-12% |
| HMW MAH-g-SEBS | 5-80% | 2-35% | 5-20% |
| Plasticizer | 10-60% | 20-40% | 25-38% |
| Secondary Polymer(s) | 4-60% | 5-25% | 6-10% |
| Processing Aid | 4-40% | 5-20% | 6-10% |
| Filler | 0-50% | 15-40% | 20-30% |
| Anti-oxidant | 0-3% | 0-2% | 0-1% |
| Anti-blocking Agent | 0-3% | 0-2% | 0-1% |
| Other Optional Additives | 0-15% | 0-10% | 0-5% |

*Though not necessarily cost-effective, one can use the HMW MAH-g-SEBS as the TPE of the present invention.

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit homogenization of the compound components. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

TPE-S of the present invention is an excellent one part of a two-part component polymer structure because it has excellent adhesion to polyamides including polyamide 6, polyamide 66, polyamide 11, polyamide 12 and others, which is often used as the more rigid part of the structure. In addition to door seals for automobiles, two-part component polymer structures are used in the following industrial and consumer products: power tool grips, integrated seals and gaskets, anti-vibration mounts, automotive interior trim, sound deadening parts, glazing gaskets, flexible membranes, and other articles now or hereafter known.

EXAMPLES

Table 2 shows five examples of the present invention, in comparison with a control (Comparative Example A) representing a traditional TPE-S that is commercially available.

TABLE 2

Formulations

| Ingredient (Wt. %) | Purpose | 1 | 2 | 3 | 4 | 5 | A |
|---|---|---|---|---|---|---|---|
| Septon 4077 SEEPS | TPE | 9 | 9 | 10 | 10 | 10 | 0 |
| Kraton MD6684CS HMW MAH-g-SEBS | Compatabilizer | 12 | 12 | 13 | 14 | 15 | 0 |
| Primol 382 Paraffinic oil | Plasticiser | 37 | 34 | 31 | 28 | 25 | 19 |
| Regalite R1125 Hydrocarbon resin | Processing Aid | 6 | 8 | 8 | 9 | 10 | 0 |
| Polybond 3200 MAH-g-PP | Secondary Polymer | 4 | 5 | 6 | 7 | 8 | 0 |
| Calcium Carbonate | Filler | 26 | 26 | 26 | 26 | 26 | 38 |
| Polyamide 6 | Secondary Polymer/ Compatabilizer | 6 | 6 | 6 | 6 | 6 | 10 |
| ETI blend (Epikote 1004/Irganox 1010, Tinuvin 327) | Antioxid/ UV package | 0.79 | 0.79 | 0.79 | 0.79 | 0.79 | 0.79 |
| Tixosil (applied externally) Precipitated silica | Anti-Blocking Agent | 0.10 | 0.10 | 0.10 | 0.10 | 0.10 | 0.10 |
| Kraton G 1654ES MAH-g-SEBS | TPE | 0 | 0 | 0 | 0 | 0 | 8 |
| Kraton FG1901x LMW MAH-g-SEBS | Compatabilizer | 0 | 0 | 0 | 0 | 0 | 20 |
| Kristalex 5140 a-methylstyrene | Processing Aid | 0 | 0 | 0 | 0 | 0 | 7 |

Table 3 shows the commercial sources for the ingredients of Table 1, with weight average molecular weight values, as applicable.

TABLE 3

Commercial Sources

| Ingredient Name | Commercial Source | Source Location |
|---|---|---|
| Septon 4077 | Kuraray | Japan/USA |
| Kraton MD6684CS | Kraton | Europe |
| Primol 382 | Exxon Mobil | Europe |
| Regalite R1125 | Eastman | USA |
| Polybond 3200 | Chemtura | USA |
| Calcium Carbonate | Omya | Europe |
| Polyamide 6 | Several | Europe |
| ETI Blend | PolyOne | Europe |
| Tixosil 38AB | Röthel GmbH | Europe |
| Kraton G 1654ES | Kraton | Europe |
| Kraton FG 1901x | Kraton | Europe |
| Kristallex 5140 | Eastman | Europe |

All formulations of Examples 1-5 and Comparative Example A had the same plasticizer, filler, secondary polymer, antioxidant, and anti-blocking agent. The formulations of Examples 1-5 differed from the formulation of Comparative Example A in the selection of TPE, compatibilizer, processing aid and the addition of a second secondary polymer, PP-g-MA, another maleated polyolefin often also used as a compatibilizer in polymer compounds.

The interchangeability between types of TPE (SEEPS vs. SEBS) is attributable to their similar molecular weights.

The difference between processing aids (hydrocarbon resin vs. alpha-methylstyrene) is attributed to the desire to the higher melting point and therefore higher service temperature, the greater effect on viscosity and the reduced odor imparted upon the compound.

The addition of MAH-g-PP is attributed to a desire to modify the hardness of the compound without impairing the adhesive nature (which would be affected by non-grafted PP).

The difference in compatibilizer (HMW MAH-g-SEBS vs. LMW MAH-g-SEBS) is attributed to a desire to the improved performance at elevated temperatures of HMW MAH-g-SEBS.

All of Examples 1-5 and Comparative Example A were made using a Werner and Pfleiderer twin-screw extruder set at 250° C. in all zones, rotating at 250 rpm. All ingredients were added at Zone 1, except for the oil which was added at the injection port. The melt-mixed compound was pelletized for further handling.

Pellets of all Examples 1-5 and Comparative Example A were molded into tensile test bars using a Demag injection molding machine, operating at 180-200° C. temperature and medium-high pressure.

Table 4 shows the experimental results.

For the adhesion tests, the following test method was used. Using the Demag injection moulding machine with dual barrels, polyamide was injected first into a custom designed tool with a moving core, after which the TPE compound was injected directly onto the polyamide. The two-component ("2K") test bars were ejected and conditioned at room temperature for 24 hours. After conditioning, an attempt was made by hand to remove the TPE strip from the polyamide substrate, and the difficulty noted. Additionally it was noted whether the bond failed by adhesive failure (where the TPE is cleanly removed from the substrate) or by cohesive failure (where a layer of TPE remains on the substrate, the interfacial strength is higher than the cohesive strength of the TPE, the optimal case).

TABLE 4

Test Results

| Test | 1 | 2 | 3 | 4 | 5 | Comp. A |
|---|---|---|---|---|---|---|
| Shore A Hardness | 30 | 40 | 50 | 60 | 70 | 70 |
| Melt Flow Index (g/10 min.) 230° C. and 5 kg | 13.9 | 16.2 | 5.8 | 2.6 | 6.8 | 10 |
| Tensile Strength (MPa) | 2.05 | 2.40 | 3.40 | 4.25 | — | 4.50 |
| Compression Set 70° C. and 22 h | 29 | 29 | 32 | 31 | 37 | 85 |
| Percent Improvement | 66% | 66% | 62% | 64% | 56% | — |
| Compression Set 100° C. and 22 hours | 65 | 62 | 59 | 60 | 62 | 96 |
| Percent Improvement | 32% | 35% | 39% | 38% | 35% | — |
| Adhesion to Polyamide 6 | Excel. | Excel. | Excel. | Excel. | Excel. | Excel. |
| Adhesion to Polyamide 6,6 (40% Glass Fiber) | Excel. | Excel. | Excel. | Excel. | Excel. | Poor |

Excel. = Excellent = Cohesive Failure
Poor = Adhesive Failure

Examples 1-5 exhibit a variety of hardnesses as well as excellent adhesion to both polyamide 6 and polyamide 6,6, two of the most popular grades of polyamide. Comparative Example A only adheres well to polyamide 6.

Even more significant is the vast improvement in compression set, seen by reviewing percent improvement of each of Examples 1-5 to Comparative Example A. At 70° C., there was at least a 50% improvement in compression set. At 100° C., there was at least a 30% improvement in compression set. In practical polymer science and engineering, these improvements in compression set mean that these compounds can maintain a better seal at elevated temperatures than their predecessors, and it indicates a better performance in general at elevated temperatures.

The invention is not limited to the above embodiments. The claims follow.

What is claimed is:

1. A thermoplastic elastomer compound, comprising:
    (a) high molecular weight maleated styrene-ethylene-butylene-styrene;
    (b) plasticizer;
    (c) processing aid;
    (d) polyamide;
    (e) a second styrene-containing thermoplastic elastomer;
    (f) optional filler;
    (g) optional anti-oxidant;
    (h) optional anti-blocking agent; and
    (i) other optional additives,
    wherein the high molecular weight maleated styrene-ethylene-butylene-styrene has a weight average molecular weight of at least 200,000,
    wherein the second styrene-containing thermoplastic elastomer is not maleated but has a weight average molecular weight in excess of 100,000, and
    wherein the weight percents of the ingredients to the compound comprise:

| | |
|---|---|
| high molecular weight maleated styrene-ethylene-butylene-styrene | 5-80% |
| plasticizer | 10-60% |
| polyamide | 4-60% |
| processing aid | 4-40% |
| second styrene-containing thermoplastic elastomer | 2-35% |
| filler | 0-50% |
| optional anti-oxidant | 0-3% |
| optional anti-blocking Agent | 0-3% |
| other optional additives | 0-15%. |

2. The compound of claim 1, wherein the second styrene-containing thermoplastic elastomer is selected from the group consisting of styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof.

3. The compound of claim 1, wherein the second styrene-containing thermoplastic elastomer is styrene-ethylene-ethylene/propylene-styrene and wherein the compound further comprises maleated polypropylene.

4. The compound of claim 1, wherein the plasticizer is a paraffinic oil.

5. The compound of claim 1, wherein the processing aid is a hydrocarbon resin.

6. The compound of claim 1, further comprising adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; additional processing aids; release agents; silanes, titanates and zirconates; slip and anti-blocking agents; stabilizers; stearates; ultraviolet light absorbers; viscosity regulators; waxes; or combinations of them.

7. A two-component article, comprising the compound of claim 1 as one component and polyamide as the second component.

8. The two-component article of claim 7, wherein the second styrene-containing thermoplastic elastomer is styrene-ethylene-ethylene/propylene-styrene and wherein the compound further comprises maleated polypropylene.

9. The compound of claim 2, wherein the plasticizer is a paraffinic oil.

10. The compound of claim 2, wherein the processing aid is a hydrocarbon resin.

11. The compound of claim 2, further comprising adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; additional processing aids; release agents; silanes, titanates and zirconates; slip and anti-blocking agents; stabilizers; stearates; ultraviolet light absorbers; viscosity regulators; waxes; or combinations of them.

12. The two-component article of claim 7, wherein the styrene-containing thermoplastic elastomer is selected from the group consisting of styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof.

13. The two-component article of claim 7, wherein the compound further comprises adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; additional processing aids; release agents; silanes, titanates and zirconates; slip and anti-blocking agents; stabilizers; stearates; ultraviolet light absorbers; viscosity regulators; waxes; or combinations of them.

* * * * *